United States Patent [19]

Morita et al.

[11] Patent Number: 5,691,049
[45] Date of Patent: Nov. 25, 1997

[54] HEAT SHRINKABLE POLYOLEFIN LAMINATE FILM

[75] Inventors: Shuichi Morita; Koji Sueoka; Fumio Horita; Toshikatsu Oyama; Hideo Isozaki, all of Yatsushiro, Japan

[73] Assignee: Kohjin Co., Ltd., Tokyo, Japan

[21] Appl. No.: 648,006

[22] PCT Filed: Sep. 22, 1995

[86] PCT No.: PCT/JP95/01914

§ 371 Date: May 24, 1996

§ 102(e) Date: May 24, 1996

[87] PCT Pub. No.: WO96/09930

PCT Pub. Date: Apr. 4, 1996

[30] Foreign Application Priority Data

Sep. 29, 1994 [JP] Japan ................... 6-258978

[51] Int. Cl.$^6$ .............. B32B 27/32; B65B 53/02
[52] U.S. Cl. .............. 428/336; 428/515; 428/516; 428/910; 428/34.9; 428/35.7
[58] Field of Search ................... 428/213, 515, 428/516, 910, 34.9, 35.2, 35.7, 333, 335, 336

[56] References Cited

U.S. PATENT DOCUMENTS 5,252,384  10/1993  Bothe et al. ................... 428/212
5,478,646  12/1995  Asanuma et al. ................... 428/364

FOREIGN PATENT DOCUMENTS 0 282 282 A2  9/1988  European Pat. Off. .
58-166049  10/1983  Japan .
63-173641   7/1988  Japan .
64-56547    3/1989  Japan .
2 221 649   2/1990  United Kingdom .

OTHER PUBLICATIONS

Derwent Publication Ltd., vol. 18, No. 506, Patent Abstracts of Japan, AN 94–237636 and JP A 06 169 974.

European Search Report dated Aug. 28, 1996, Ref. No. L 59 758 listing above cited references.

*Primary Examiner*—Paul J. Thibodeau
*Assistant Examiner*—D. Lawrence Tarazano
*Attorney, Agent, or Firm*—Armstrong, Westerman, Hattori, McLeland & Naughton

[57] ABSTRACT

A heat shrinkable polyolefin laminate film having surface layers made of a crystalline polypropylene resin, and an intermediate layer made of an ethylene resin composition consisting essentially of a linear low density polyethylene and a syndiotactic polypropylene, which is stretched at least two times in the machine and transverse directions, respectively, and which does not cause lowering of the transparency even if recovered films are incorporated into the intermediate layer, is excellent in low temperature shrinkability and packaging machine applicability, and is suitably used as a heat shrinkable packaging material.

1 Claim, 1 Drawing Sheet

HEAT SHRINKABLE POLYOLEFIN LAMINATE FILM

TECHNICAL FIELD

The present invention relates to a heat shrinkable polyolefin film, and more particularly to a heat shrinkable laminate film having an intermediate layer made of an ethylene resin composition consisting essentially of a linear low density polyethylene and a syndiotactic polypropylene and being excellent in transparency and low temperature shrinkability.

BACKGROUND ART

Polyvinyl chloride films, polyethylene films, polypropylene films and the like are hitherto known as heat shrinkable packaging materials. From the viewpoint of low price and easiness in disposal after use, heat shrinkable films of polyolefins such as polyethylene and polypropylene have been preferably used. However, among them, heat shrinkable polyethylene films have a feature of being excellent in impact resistance and the like, but they have the defect that because of lacking a film firmness, they are not satisfactory for use in high speed packaging. On the other hand, heat shrinkable polypropylene films have a film firmness and accordingly have an excellent packaging machine applicability, but have the defect that no shrinkage occurs unless the temperature is relatively high.

As a means to solve the above-mentioned defects, the present inventors proposed a heat shrinkable laminate film comprising a polyethylene resin layer and a polypropylene resin layer (Japanese Patent Publication Kokai No. 63-173641).

The proposed film is a good heat shrinkable film having both a low temperature shrinkability and a good film firmness, but it has a problem that the transparency is lowered if pieces of films generated in the manufacturing steps and films out of standard (hereinafter referred to as "recovered films") are recycled.

DISCLOSURE OF THE INVENTION

The present inventors have made intensive studies to obtain heat shrinkable films free of the above-mentioned defects, and as a result, they have arrived at the present invention.

That is to say, the present invention provides a heat shrinkable polyolefin laminate film, which is excellent in low temperature shrinkability and free of lowering of the transparency in case of recycling recovered films, comprising an intermediate layer and surface layers, said intermediate layer comprising an ethylene resin composition consisting essentially of (A) 80 to 50 parts by weight of a linear low density polyethylene comprising ethylene and an α-olefin and having a density of 0.91 to 0.93 g/cm$^3$ at 25° C. and a melt index of 0.2 to 3.0 g/10 minutes and (B) 20 to 50 parts by weight of a syndiotactic polypropylene, and said surface layers comprising a crystalline polypropylene resin, wherein the thickness of said intermediate layer is not less than 30% of the total thickness, the thickness of each of said surface layers is at least 1 μm, and said film is stretched at least two times in both the machine and transverse directions.

The present invention is explained in detail below.

The linear low density polyethylene (A) comprising ethylene and an α-olefin and being used as one of the components of the intermediate layer has a density of 0.91 to 0.93 g/cm$^3$ at 25° C. and a melt index of 0.2 to 3.0 g/10 minutes. The polyethylene (A) having a density of less than 0.91 g/cm$^3$ is not preferable because of a little effect of improving the film firmness and because the transparency is lowered when the recovered films are recycled. If the density is more than 0.93 g/cm$^3$, it is not preferable because of insufficient low temperature shrinkability. Also, the polyethylene (A) having a melt index of less than 0.2 g/10 minutes is not preferable because of increase in a motor load at melt-extrusion. If the melt index is more than 3.0 g/10 minutes, it is not preferable since the stability in a stretching step is deteriorated. Also, as the α-olefin to be copolymerized with ethylene, perferred are one or more members selected from the group consisting of butene-1, pentene-1, hexene-1, heptene-1, octene-1, 4-methylpentene-1, decene-1, undecene-1 and dodecene-1. The mixing amount of the linear low density polyethylene is from 80 to 50 parts by weight. If the amount is less than 50 parts by weight, the low temperature shrinkability and the impact resistance are lowered.

The syndiotactic polypropylene (B) which is used together with the linear low density polyethylene in the intermediate layer of the present invention is a polypropylene having a high syndiotacticity such that the syndiotactic pentad fraction measured by $^{13}$C-NMR is not less than 0.7, unlike a conventional syndiotactic polypropylene having a low syndiotacticity obtained by using a vanadium catalyst. The syndiotactic polypropylene (B) can be obtained by using a catalyst composed of a co-catalyst and a crosslinking type transition metal compound having ligands non-symmetrical to each other as described in, for example, Japanese Patent Publication Kokai Nos. 2-41303, 2-41305, 2-274703, 2-274704, 3-179005 and 3-179006. Also, the measurement of syndiotactic pentad fraction by $^{13}$C-NMR can be made by a known method as described, for example, in Japanese Patent Publication Kokai No. 2-41303. The mixing amount of the syndiotactic polypropylene is from 20 to 50 parts by weight. The use thereof in an amount of less than 20 parts by weight is not preferable because of a little effect on the improvement of transparency in recycling the recovered films. When the recovered films are recycled, it is a matter of course that the crystalline polypropylene used in the surface layers is incorporated into the intermediate layer, and the intermediate layer may contain, in addition to the above-mentioned resin composition, other resins, e.g., a high pressure process polyethylene, an ethylene-vinyl acetate copolymer, an ionomer, a propylene-butene copolymer and the like so long as the objects of the present invention are not hindered.

As the crystalline polypropylene used in the surface layers of the present invention, there are used known polymers composed mainly of propylene such as a propylene-ethylene copolymer and a propylene-ethylene-butene terpolymer, and mixtures of these polymers with a thermoplastic polymer capable of forming a film when mixed with these polymers. The propylene-ethylene copolymer and the propylene-ethylene-butene terpolymer are those containing 2 to 10% by weight of units of ethylene or units of ethylene and butene. As the thermoplastic polymer, there can be used an ethylene-vinyl acetate copolymer, an ethylene-α-olefin copolymer, a propylene-butene copolymer, an ionomer, a polybutene, a petroleum resin and the like so long as the objects of the present invention are not hindered.

In the present invention, the intermediate layer is not necessarily composed of one layer, and can be composed of two or more layers as occasion demands. The thickness of the intermediate layer is required to be not less than 30% of the total thickness. If the thickness is less than 30%, no sufficient low temperature shrinkage is obtained. Also the thickness of the surface layer comprising the crystalline polypropylene resin is at least 1 µm, preferably at least 2 µm. If the thickness of each surface layer is less than 1 µm, a good packaging machine applicability that the crystalline polypropylene resin has, cannot be exhibited fully, and in addition, the heat resistance at the time of shrinking is poor.

In addition, additives such as a lubricant, an anti-blocking agent, an antistatic agent and an anti-fogging agent may be suitably used for the purpose of providing the respective useful functions, as occasion demands. They are particularly effective when added to the surface layers.

Next, a process for preparing the films of the present invention is described below. The preparation of the stretched films of the present invention using the above-mentioned resins can be conducted by known methods. A detailed explanation is given below taking the case of forming and stretching a three-layered tubular laminate film.

Firstly, a composition comprising the above-mentioned linear low density polyethylene, syndiotactic polypropylene and recovered films and the crystalline polypropylene resin are melt-kneaded in three extruders, co-extruded in a tubular form through a three-layered circular die so that the composition forms an intermediate layer and the crystalline polypropylene resin forms surface layers, and once solidified by rapid cooling without stretching to give a tubular non-stretched film.

The obtained tubular non-stretched film is fed to a tubular stretching apparatus, for instance, as shown in FIG. 1, and is subjected to a simultaneous biaxial orientation by inflation stretching within a temperature range capable of achieving a high degree of orientation, for example, at a temperature lower than the melting point of the intermediate layer resin by at least 10° C., preferably at least 15° C., applying a gas pressure to the inside of the tube. The stretching ratios are not always required to be the same in the machine and transverse directions, but it is preferable in obtaining excellent physical properties such as strength and rate of shrinkage to stretch the film at least 2 times, preferably at least 2.5 times, more preferably at least 3 times, in both the machine and transverse directions. The film taken out of the stretching apparatus can be annealed if desired, and spontaneous shrinkage during the storage can be inhibited by this annealing.

BEST MODE FOR CARRYING OUT THE INVENTION

Figure 1:
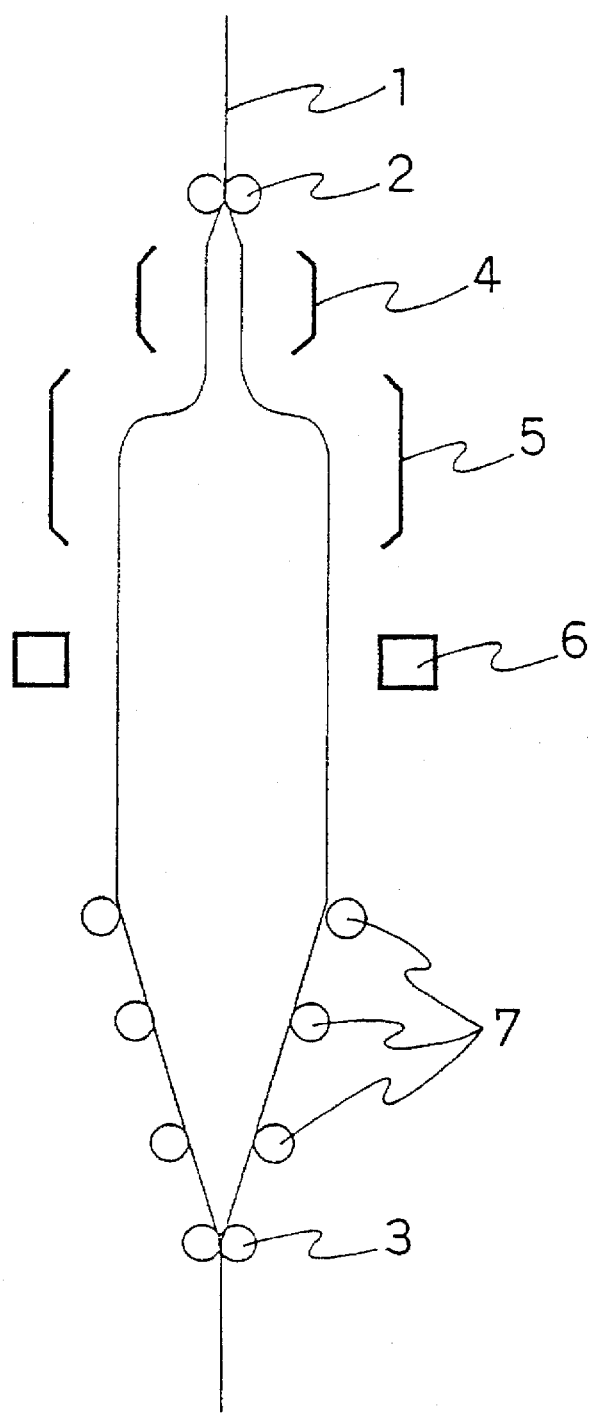
FIG. 1 is a schematic section view illustrating a tubular biaxial stretching apparatus used in Examples, wherein 1 is a non-stretched film, 2 is low-speed nip rolls, 3 is high-speed nip rolls, 4 is a preheater, 5 is a main heater, 6 is a cooling air ring and 7 is collapser rolls.

The present invention is concretely explained by means of the following Examples, but is not limited to these Examples. The measurements of respective physical properties shown in the Examples were made by the following methods.
1) Thickness of the whole
  Measured by a hand micrometer
2) Thickness of surface layers
  The thickness of surface layers was measured by observing the cross section of a film with a microscope.
3) Haze Measured according to JIS K 6714
4) Gloss (60°)
  Measured according to JIS Z 8741
5) Area shrinkage
  A film cut in a square of 10 cm×10 cm was dipped in a glycerol bath at 100° C. for 10 seconds, and rapidly cooled in water. Then, the lengths in the machine and transverse directions of the specimen were measured and the rate of area shrinkage was calculated according to the equation (1).

$$\text{Rate of area shrinkage } (\%) = 100 - A \times B \tag{1}$$

wherein A and B are lengths (cm) in the machine and transverse directions after rapid cooling.
6) Packaging machine applicability
  Instant cup-noodle was packaged at a speed of 100 cups/minute by an automatic packaging machine (model PW-R2, a pillow type packaging machine) manufactured by Tokiwa Kogyo Kabushiki Kaisha, and the packaged state was observed.

EXAMPLE 1

A propylene-ethylene random copolymer having an ethylene content of 4.2% by weight for surface layers and a composition for an intermediate layer consisting of 80 parts by weight of a linear low density polyethylene having a density of 0.916 g/cm³ and an MI of 1.2 g/10 minutes and 20 parts by weight of a syndiotactic polypropylene (product of Mitsui Toatsu Kagaku Kabushiki Kaisha) having a syndiotacticity of 0.79 and an MI of 4.9 g/10 minutes were melt-kneaded at a temperature of 170° to 240° C. respectively in three extruders. The extrusion outputs from the respective extruders were set so as to obtain the thickness ratio shown in Table 1, and they were co-extruded downward from a three-layer circular die kept at 240° C.

The formed three-layer tube was cooled by sliding the inner side on the outer surface of a cylindrical cooling mandrel wherein a cooling water was circulated and by passing the outer side through a water bath, and taken out to give a non-stretched film having a diameter of 75 mm and a thickness of 240 µm. This tubular non-stretched film was led to a tubular biaxial stretching apparatus shown in FIG. 1 and stretched 4 times in both machine and transverse directions at a temperature of 90° to 110° C. to give a biaxially stretched laminate film. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also non-uniform stretching state such as necking was not observed. The obtained stretched film had a thickness ratio as shown in Table 1, and had excellent transparency, gloss and low temperature shrinkability. Also, in estimation by packaging using a pillow type packaging machine, the film had a good packaging machine applicability in a wide temperature range in respect of both heat seal temperature and shrinking tunnel temperature.

EXAMPLE 2

A biaxially stretched laminate film having a thickness ratio shown in Table 1 was prepared in the same manner as in Example 1 except that the film prepared in Example 1 was re-pelletized by a twin screw extruder and 30 parts by weight of the pellets (recovered films) were incorporated into the intermediate layer. This stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had a thickness ratio as shown in Table 1, and had excellent transparency, gloss and low temperature shrinkability. Also, in estimation by packaging using a pillow type packaging machine, the film had a good packaging machine applicability in a wide temperature range in respect of both heat seal temperature and shrinking tunnel temperature.

EXAMPLE 3

A stretched film having a thickness ratio shown in Table 1 was prepared in the same manner as in Example 1 by using the same propylene-ethylene random copolymer as in Example 1 for the surface layers and a mixture of the same linear low density polyethylene and syndiotactic polypropylene as in Example 1 in amounts of 50% by weight, respectively, for the intermediate layer. This stretched film had a haze of 2.4%, a gloss of 135% and an area shrinkage of 41%, and had a good packaging machine applicability. This stretched film was then re-pelletized by a twin screw extruder.

A stretched film having a thickness ratio shown in Table 1 was then prepared in the same manner as in Example 1 by using a composition consisting of 30 parts by weight of the re-pelletized film, 50 parts by weight of the linear low density polyethylene and 50 parts by weight of the syndiotactic polypropylene for the intermediate layer, and the above-mentioned propylene-ethylene random copolymer for the surface layers. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had a thickness ratio as shown in Table 1, and had excellent transparency, gloss and low temperature shrinkability. Also, in estimation by packaging using a pillow type packaging machine, the film had a good packaging machine applicability in a wide temperature range in respect of both heat seal temperature and shrinking tunnel temperature.

EXAMPLE 4

A stretched film having a thickness ratio shown in Table 1 was prepared in the same manner as in Example 1 by using a propylene-ethylene random copolymer having an ethylene content of 3.4% by weight for the surface layers and a mixture of 70 parts by weight of a linear low density polyethylene having a density of 0.925 g/cm$^3$ and an MI of 1.6 g/10 minutes and 30 parts by weight of the same syndiotactic polypropylene as in Example 1, for the intermediate layer. This stretched film had a haze of 2.6%, a gloss of 134% and an area shrinkage of 41%, and had a good packaging machine applicability. This stretched film was then re-pelletized by a twin screw extruder.

A stretched film having a thickness ratio shown in Table 1 was then prepared in the same manner as in Example 1 by using a composition consisting of 40 parts by weight of the re-pelletized film, 70 parts by weight of the linear low density polyethylene and 30 parts by weight of the syndiotactic polypropylene for the intermediate layer and the above-mentioned propylene-ethylene random copolymer for the surface layers. The stretched film was then treated with a hot air of 75° C. for 10 seconds in a tube sealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had a thickness ratio as shown in Table 1, and had excellent transparency, gloss and low temperature shrinkability. Also, in estimation by packaging using a pillow type packaging machine, the film had a good packaging machine applicability in a wide temperature range in respect of both heat seal temperature and shrinking tunnel temperature.

COMPARATIVE EXAMPLE 1

A stretched film having a thickness ratio shown in Table 1 was prepared in the same manner as in Example 1 by using the same propylene-ethylene random copolymer as in Example 1, for surface layers and a composition consisting of 80% by weight of the same linear low density polyethylene as used in Example 1 and 20% by weight of the same propylene-ethylene random copolymer as used in the surface layers, for an intermediate layer. The stretched film was then treated with a hot air of 75° C. for 10 seconds in a tube sealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had characteristics as shown in Table 1, and had excellent low temperature shrinkability. Also, in estimation by packaging using a pillow type packaging machine, the film had a good packaging machine applicability in a wide temperature range in respect of both heat seal temperature and shrinking tunnel temperature, but was inferior in transparency and gloss.

COMPARATIVE EXAMPLE 2

A stretched film having a thickness ratio shown in Table 1 was prepared in the same manner as in Example 1 by using the same propylene-ethylene random copolymer as in Example 1 for surface layers and a composition comprising 90% by weight of the same linear low density polyethylene and 10% by weight of the same syndiotactic polypropylene as in Example 1 for an intermediate layer. This stretched film had a haze of 2.4%, a gloss of 135% and an area shrinkage of 49%, and had a good packaging machine applicability. This stretched film was then re-pelletized by a twin screw extruder.

A stretched film having a thickness ratio shown in Table 1 was then prepared in the same manner as in Example 1 by using a composition comprising 30 parts by weight of the re-pelletized film, 90 parts by weight of the linear low density polyethylene and 10 parts by weight of the syndiotactic polypropylene for the intermediate layer and the above-mentioned propylene-ethylene random copolymer for the surface layers. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had characteristics as shown in Table 1, and had an excellent low temperature shrinkability. Also, in estimation by packaging using a pillow type packaging machine, the film had a good packaging machine applicability in a wide temperature range in respect of both heat seal temperature and shrinking tunnel temperature, but was inferior in transparency and gloss.

COMPARATIVE EXAMPLE 3

A stretched film having a thickness ratio shown in Table 1 was prepared in the same manner as in Example 1 by using the same propylene-ethylene random copolymer as in Example 1 for surface layers and a composition comprising 40% by weight of the same linear low density polyethylene and 60% by weight of the same syndiotactic polypropylene as in Example 1 for an intermediate layer. This stretched film had a haze of 2.7%, a gloss of 133% and an area shrinkage of 35%, was inferior in low temperature shrinkability, and had a narrow range of shrinking tunnel temperature. This stretched film was re-pelletized by a twin screw extruder.

A stretched film having a thickness ratio shown in Table 1 was then prepared in the same manner as in Example 1 by using a composition comprising 30 parts by weight of the re-pelletized film, 40 parts by weight of the same linear low density polyethylene as above and 60 parts by weight of the same syndiotactic polypropylene as above for the intermediate layer, and the above-mentioned propylene-ethylene random copolymer for the surface layers. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had characteristics as shown in Table 1, and had excellent transparency and gloss, but was inferior in low temperature shrinkability. In estimation of the film by packaging using a pillow type packaging machine, the shrinking tunnel temperature range capable of providing a good finish was narrow.

COMPARATIVE EXAMPLE 4

A stretched film having a thickness ratio shown in Table 1 was prepared in the same manner as in Example 1 by using the same propylene-ethylene random copolymer as in Example 1 for surface layers and a composition comprising 70% by weight of the same linear low density polyethylene and 30% by weight of the same syndiotactic polypropylene as in Example 1 for an intermediate layer. This stretched film had a haze of 2.6%, a gloss of 133% and an area shrinkage of 45%. In estimation of the film by packaging using a pillow type packaging machine, there was seen whitening or melting (formation of holes in the film) of the film at a relatively low temperature, and the shrinking tunnel temperature range was narrow. This stretched film was then re-pelletized by a twin screw extruder.

A stretched film in which each of the surface layers had a thickness of 0.8 µm was then prepared in the same manner as in Example 1 by using a composition comprising 30 parts by weight of the re-pelletized film, 70 parts by weight of the above-mentioned linear low density polyethylene and 30 parts by weight of the above-mentioned syndiotactic polypropylene for the intermediate layer, and the above-mentioned propylene-ethylene random copolymer for the surface layers. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had characteristics as shown in Table 1, and had excellent transparency, gloss and low temperature shrinkability. Also, in estimation of the film by packaging using a pillow type packaging machine, there was seen whitening or melting (formation of holes in the film) of the film at a relatively low temperature, and the shrinking tunnel temperature range capable of providing a good finish was narrow.

COMPARATIVE EXAMPLE 5

A stretched film having a thickness ratio shown in Table 1 was prepared in the same manner as in Example 1 by using the same propylene-ethylene random copolymer as in Example 1 for surface layers and a composition consisting of, as shown in Table 1, 70% by weight of a linear low density polyethylene having a density of 0.890 g/cm$^3$ and an MI of 0.8 g/10 minutes and 30% by weight of a syndiotactic polypropylene for an intermediate layer. This stretched film had a haze of 2.6%, a gloss of 133% and an area shrinkage of 53%, and in estimation by packaging using a pillow type packaging machine, there was a trouble of snaking of the film. This stretched film was then re-pelletized by a twin screw extruder.

A stretched film having a thickness ratio shown in Table 1 was then prepared in the same manner as in Example 1 by using a composition comprising 30 parts by weight of the re-pelletized film, 70 parts by weight of the above-mentioned linear low density polyethylene and 30 parts by weight of the above-mentioned syndiotactic polypropylene for the intermediate layer, and the above-mentioned propylene-ethylene random copolymer for the surface layers. The stretched film was then treated with a hot air of 75° C. for 10 seconds in a tube annealing apparatus, cooled to room temperature, collapsed and wound up.

The stability during the stretching was good, vertical motion of the stretching point and swaying of the stretched tube did not occur, and also nonuniform stretching state such as necking was not observed. The obtained stretched film had characteristics as shown in Table 1. Though the film had a low temperature shrinkability, it was inferior in transparency and gloss. In estimation by packaging using a pillow type packaging machine, there was a trouble of snaking of the film.

INDUSTRIAL APPLICABILITY

As explained above, the heat shrinkable polyolefin film of the present invention comprises surface layers of a crystalline polypropylene resin and an intermediate layer of a linear low density polyethylene resin mixed with a specific syndiotactic polypropylene, and it does not cause lowering of the transparency even if recovered films are incorporated into the intermediate layer, and is suitable as a heat shrinkable packaging material excellent in low temperature shrinkability and packaging machine applicability.

TABLE 1

|  | Example 1 | Example 2 | Example 3 | Example 4 |
|---|---|---|---|---|
| Raw materials | | | | |
| Surface layers | Propylene-ethylene random copolymer | Propylene-ethylene random copolymer | Propylene-ethylene random copolymer | Propylene-ethylene-butene terpolymer |
| Intermediate layer | A: LLDPE-1<br>B: S-PP<br>(Mixing weight ratio)<br>A/B = 80/20 | A: LLDPE-1<br>B: S-PP<br>C: Recovered films<br>(Mixing weight ratio)<br>A/B/C = 80/20/30 | A: LLDPE-1<br>B: S-PP<br>C: Recovered films<br>(Mixing weight ratio)<br>A/B/C = 50/50/30 | A: LLDPE-2<br>B: S-PP<br>C: Recovered film<br>(Mixing weight ratio)<br>A/B/C = 70/30/40 |
| Thickness (μm) | | | | |
| The whole | 15 | 15 | 15 | 15 |
| Surface layers | 2 each | 2 each | 2 each | 4 each |
| Haze (%) | 2.4 | 2.8 | 2.5 | 2.5 |
| Gloss (%) | 135 | 132 | 134 | 135 |
| Area shrinkage (%) | 51 | 47 | 41 | 42 |
| Packaging machine applicability | ○ | ○ | ○ | ○ |

|  | Com. Ex. 1 | Com. Ex. 2 | Com. Ex. 3 | Com. Ex. 4 | Com. Ex. 5 |
|---|---|---|---|---|---|
| Raw materials | | | | | |
| Surface layers | Propylene-ethylene random copolymer | Propylene-ethylene random copolymer | Propylene-ethylene random copolymer | Propylene-ethylene random copolymer | Propylene-ethylene random copolymer |
| Intermediate layer | A: LLDPE-1<br>B: P-E<br>(Mixing weight ratio)<br>A/B = 80/20 | A: LLDPE-1<br>B: S-PP<br>C: Recovered film<br>(Mixing weight ratio)<br>A/B/C = 90/10/30 | A: LLDPE-1<br>B: S-PP<br>C: Recovered film<br>(Mixing weight ratio)<br>A/B/C = 40/60/30 | A: LLDPE-1<br>B: S-PP<br>C: Recovered film<br>(Mixing weight ratio)<br>A/B/C = 70/30/30 | A: LLDPE-3<br>B: S-PP<br>C: Recovered film<br>(Mixing weight ratio)<br>A/B/C = 70/30/30 |
| Thickness (μm) | | | | | |
| The whole | 15 | 15 | 15 | 15 | 15 |
| Surface layers | 2 each | 2 each | 2 each | 0.8 each | 2 each |
| Haze (%) | 4.9 | 4.2 | 2.4 | 2.7 | 3.8 |
| Gloss (%) | 105 | 115 | 134 | 132 | 117 |
| Area shrinkage (%) | 42 | 49 | 32 | 44 | 53 |
| Packaging machine applicability | ○ | ○ | Δ | Δ | Δ |

Intermediate layer
A: LLDPE-1 (density: 0.916 g/cm², MI: 1.2 g/10 minutes), LLDPE-2 (density: 0.925 g/cm², MI: 1.6. g/10 minutes), LLDPE-3 (density: 0.900 g/cm², MI: 0.8 g/10 minutes)
B: S-PP (Syndiotactic polypropylene), P-E (propylene-ethylene random copolymer)

We claim:

1. A heat shrinkable polyolefin laminate film comprising an intermediate layer and surface layers, said intermediate layer comprising an ethylene resin composition consisting essentially an ethylene resin composition consisting essentially of (A) 80 to 50 parts by weight of a linear low density polyethylene comprising ethylene and an α-olefin and having a density of 0.91 to 0.93 g/cm³ at 25° C. and a melt index of 0.2 to 3.0 g/10 minutes and (B) 20 to 50 parts by weight of a syndiotactic polypropylene, and said surface layers comprising a crystalline polypropylene resin, wherein the thickness of said intermediate layer is not less than 30% of the total thickness, the thickness of each of said surface layers is at least 1 μm, said film is stretched at least two times in both the machine and transverse directions, and the syndiotactic pentad fraction measured by $^{13}$C-NMR of said syndiotactic polypropylene (B) is not less than 0.7.

* * * * *